United States Patent [19]
Federspiel

[11] 3,840,253
[45] Oct. 8, 1974

[54] QUICK RELEASE DRAG LINK HITCH ASSEMBLY

[75] Inventor: Joseph A. Federspiel, Port Washington, Wis.

[73] Assignee: FMC Corporation, San Jose, Calif.

[22] Filed: Nov. 6, 1972

[21] Appl. No.: 304,173

[52] U.S. Cl.................... 280/510, 85/8.8, 287/100, 280/473, 280/515
[51] Int. Cl............................................. B60d 1/02
[58] Field of Search ........... 280/510, 508, 509, 515; 172/272, 275; 85/8.8; 287/100; 56/294

[56] References Cited
UNITED STATES PATENTS

| | | | |
|---|---|---|---|
| 1,782,196 | 11/1930 | Dalton | 287/52.08 |
| 2,530,083 | 11/1950 | Ruch | 85/8.8 |
| 2,602,389 | 7/1952 | Markel | 172/275 X |
| 2,904,350 | 9/1959 | Seng | 280/510 |
| 2,996,126 | 8/1961 | Voegeli | 172/272 |
| 3,198,056 | 8/1965 | Gowan | 85/8.8 |
| 3,605,906 | 9/1971 | Coates | 172/272 |

Primary Examiner—Leo Friaglia
Attorney, Agent, or Firm—A. J. Moore; C. E. Tripp

[57] ABSTRACT

Presented is a quick release drag link hitch assembly for use in conjunction with tractors and the like to permit the quick attachment and detachment of various types of implements to a single tractor frame.

4 Claims, 4 Drawing Figures

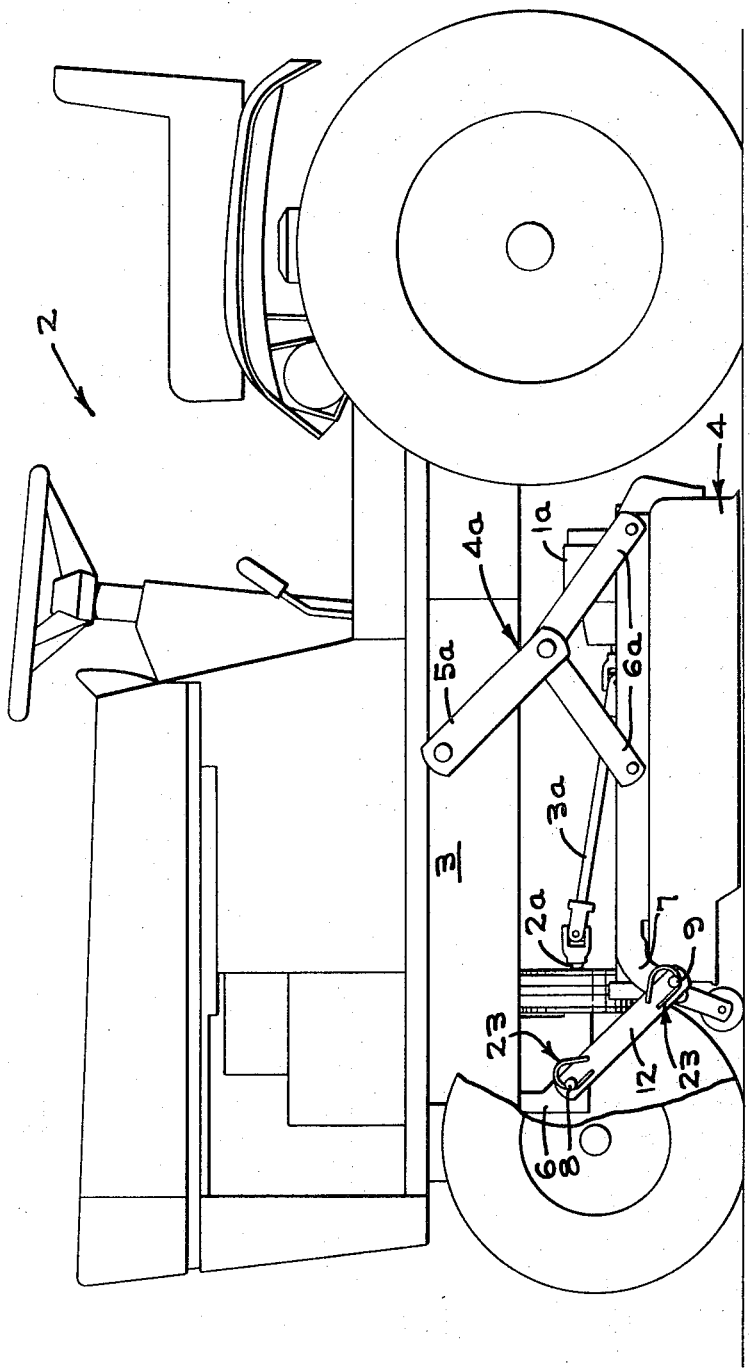

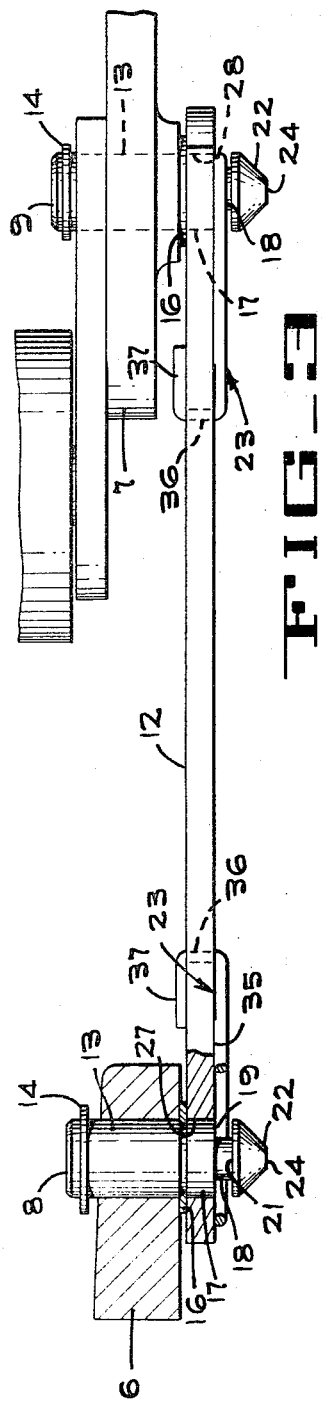
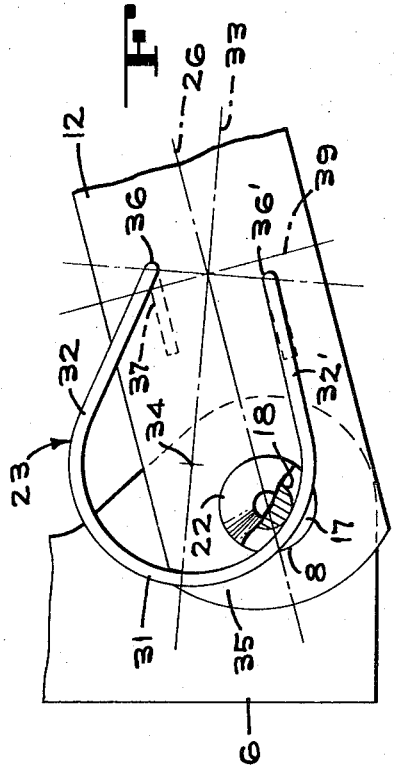
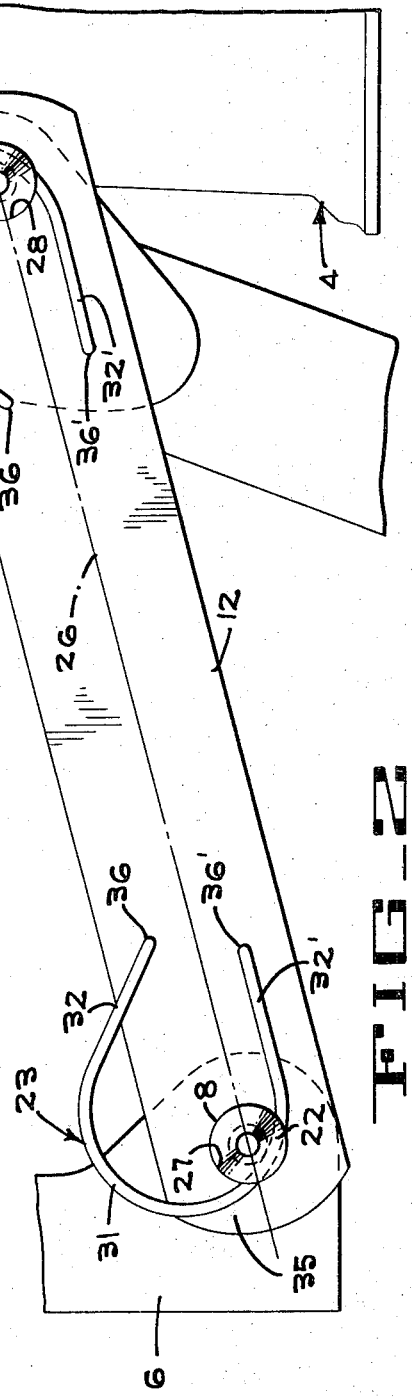

3,840,253

QUICK RELEASE DRAG LINK HITCH ASSEMBLY

BACKGROUND OF THE INVENTION

Widespread and expanding use of garden tractors by homeowners, gardeners and landscape architects has in part resulted from the availability of a variety of attachments that increase the tasks formerly done by hand or by separate power equipment. Small tractors have been designed for use by homeowners for such weekly functions as mowing the lawn, cultivating, hauling wood or clearing snow. For all of these purposes, separate implements have been designed which are readily attachable and detachable from the basic tractor structure.

Heretofore, so far as is known, the attachment of these separate implements to the basic tractor structure is more easily accomplished by two people to manipulate the implement and to assemble separate parts such as pins, bolts or clips. Accordingly, it is one of the objects of the present invention to provide a quick-release drag link hitch assembly for implements that may be easily and quickly connected by a single person and which does not utilize separate clips or pins or attachments.

One of the favorite methods of attachment of implements is to provide complementary apertured brackets through which a pivot pin is inserted. A cotter pin through the free end of the pivot pin locks the pivot pin in the brackets. The problem which arises with this construction is that relative movement between the parts causes wear on the cotter pin, which periodically shears, thus permitting the pivot pin to slip out and be lost in the grass or loose dirt. Accordingly, it is another object of the invention to provide a quick-release drag link hitch assembly in which the conventional cotter pin connection is eliminated.

Another object of the invention is to provide a quick-release drag link hitch assembly which is applicable without the use of any specialized tools.

There are of course quick release catches and safety lock devices of various kinds in the prior art. Examples are taught by U.S. Pat. Nos. 3,100,661; 2,530,083; 1,782,196; 3,198,056; 3,222,854; 2,847,238; 3,080,184; 2,674,913; and 2,668,723. Most of the devices taught by these patents relate to an assembly not intended to be frequently attached and detached. In other respects, the devices taught by these patents are utilized in an environment not subjected to the abuse to which a tractor structure is inherently subjected. Additionally, because of the environment in which the instant quick-release drag link hitch assembly is utilized, the design must incorporate means for preventing inadvertent disengagement during use through the action of weeds, clods, or other objects that might tend to release the assembly. It is therefore a still further object to provide a quick-release drag link hitch assembly which fulfills these needs.

The invention possesses other objects and features of advantage, some of which, with the foregoing, will be apparent from the following description and the drawings. It is to be understood, however, that the invention is not limited to the embodiment illustrated and described, as it may be embodied in various forms within the scope of the appended claims.

BRIEF SUMMARY OF THE INVENTION

In terms of broad inclusion, the quick-release drag link hitch assembly of the invention comprises a headed through-pin adapted to extend through an apertured support bracket and to be secured thereto, the support bracket forming a part of a tractor or other vehicle. The free end of the pin adjacent one side of the support bracket projects cantilever fashion therefrom and is provided with a bearing portion and a locking portion. The bearing portion is adapted to receive thereon, and to effectively journal, a drag link associated with the implement to be attached to the tractor. Cooperating resilient clip means are provided permanently mounted on the drag link so as to cooperate with the locking means on the through-pin to lock the drag link to the through-pin when the through-pin is inserted through an aperture in the drag link.

BRIEF DESCRIPTION OF THE DRAWINGS

FIG. 1 is a side elevational view illustrating a tractor having a mower assembly attached thereto through use of the quick release drag link assembly of the invention.

FIG. 2 is a fragmentary side elevational view in enlarged scale illustrating the drag link hitch assembly attached at both ends to an associated support bracket in the manner taught by this invention.

FIG. 3 is a top plan view of the drag link assembly, a portion of the support bracket and drag link being shown in horizontal section.

FIG. 4 is a fragmentary side elevational view partly in section, illustrating the relationship between the resilient clip permanently attached to the drag link and the locking portion of the through-pin.

DESCRIPTION OF THE PREFERRED EMBODIMENT

In terms of greater detail, and with reference to FIG. 1, the quick-release drag link hitch assembly of the invention is adapted for use with a tractor designated generally by the numeral 2. As illustrated, the tractor is provided with a main frame 3 from which is suspended an implement 4, in this case constituting a mower assembly the design of which forms no part of this invention. The mower is attached to the under carriage of the tractor through appropriate brackets 6 and 7 permanently attached to the tractor and provided with apertures adapted to receive through-pins 8 and 9. These through-pins form the pivot connections for a drag link 12, quickly and easily attachable and detachable to the through-pins in a manner which will hereinafter be explained in greater detail.

The mower 4 includes a transmission 1a which is connected to a power take-off 2a by a drive shaft 3a. A linkage arrangement 4a including a lift arm 5a and lift links 6a connects the rear portion of the mower 4 to the tractor. The linkage arrangement is the subject matter of my U.S. application Ser. No. 312,011, filed on Dec. 4, 1972, now U.S. Pat. No. 3,796,028 and assigned to the assignee of the present application.

As illustrated in detail in FIG. 3, each through-pin 8 and 9 is provided with a shank portion 13 pivotally disposed in the associated bracket by appropriate split-spring rings 14 and 16, seated in grooves formed in the pin on opposite sides of the supporting bracket. It will thus be seen that since the brackets 6 and 7 constitute a permanent part of the structure, once the through-pins 8 and 9 are mounted on the associated brackets and the split-spring rings 14 and 16 applied, each through-pin is effectively permanently mounted to the tractor and implement structure.

Each of the through-pins 8 and 9 is provided with a bearing portion 17 defined on one side by the groove within which the split ring 16 is seated, and on the opposite side by a circular groove 18 the sides 19 and 21 of which are perpendicular to the axis of the through-pin and cooperate with an adjacent conically tapered portion 22 of the through-pin to form a locking means for a spring clip designated generally by the numeral 23.

It should be noted that the bearing portion 17 of the through-pins on which the drag link 12 is pivotally disposed is of substantially the same diameter as the shank portion 13 pivotally supported in the support brackets 6 and 7. Preferably, the conically tapered end portion 22 of the through-pin is tapered at such an angle that the small truncated base 24 thereof is of smaller diameter than the diameter of the through-pin at the bottom of the groove 18. In this manner, the conically tapered end of the through-pin functions as a cam in connection with the resilient clip 23 to facilitate locking of the drag link 12 to the through-pin.

As illustrated in FIGS. 2 and 4, the drag link 12 constitutes an elongated member generally symmetrical about a longitudinal axis 26 and is fabricated from bar stock. Apertures 27 and 28 are formed in opposite end portions of the drag link, the axes of the apertures being located along the axis line 26.

The apertures 27 and 28 in the drag link are proportioned to fit more or less snugly over the end of the through-pin and specifically to possess a rotatable, journaled relationship on the bearing portion 17 of each of the through-pins. Thus, as illustrated in FIG. 3, with the drag link properly positioned, there is little axial displacement of the drag link between the two through-pins 8 and 9, the amount being determined by the tolerances permitted between the bearing portion 17 of each pin and the aperture within which it fits.

Referring to FIGS. 2 and 4, it will be seen that each resilient clip 23 is generally elongated and provided with a semi-circular portion 31 integral with leg portions 32 and 32'. The elongated C-shaped clip is fabricated from a resilient metal wire and in configuration is generally symmetrical in respect with a longitudinal axis 33 which in general passes through the center 34 about which the semi-circular portion 31 of the spring clip is formed.

When applied to the drag link, the clip lies in planar abutment with the associated surface 35 of the drag link, each clip being provided with perpendicular bearing portions 36 and 36' adapted to project snugly through appropriate apertures formed in the drag link. On the far side of the drag link, the bearing portions 36 are integral with clamp portions 37 and the bearing portions 36' are integral with clamp portions 37' which are bent over flat against the far side of the drag link in generally parallel relationship to the body of the spring clip on the near side of the drag link. Thus, the resilient clip lies tightly clamped against the surface 35 of the drag link, capable of being sprung into and out of the groove 18 formed in the associated through-pin.

It is important to note that the semi-circular portion 31 of each resilient clip passes over the associated aperture 27 or 28 in such a position that in its relaxed or normal position, a portion of the resilient clip will lie trapped in the groove 18 when the drag link is applied to the through-pin. However, to achieve this locking position, the spring clip must be resiliently displaced parallel to the face 35 of the drag link sufficiently to clear the large diameter portion of the truncated conical portion 22 of the through-pin so that the spring clip can snap into the groove 18.

To accomplish such displacement in one aspect of this invention, the degree of taper of the conical portion 22 of the through-pin is chosen so that when the aperture 27 or 28 of the drag link is lined up with axis of the through-pin and the drag link is pressed onto the through-pins, the tapered end of each through-pin will engage the inner periphery of the associated semi-circular portion of the resilient clip. Continued pressure on the drag link causes the tapered portion 22 to apply a camming action to the resilient clip, thus causing its lateral displacement in a plane parallel to the face 35 of the drag link. It will thus be seen that all that is required to mount the drag link on the through-pins is to line up the apertures 27 and 28 and push against the drag link to effect a temporary resilient displacement of each of the resilient clips. Once each clip has been pushed past the large base of the truncated conical portion 22, the resilient clip will snap into the groove 18 and thus lock the drag link to the groove pin.

Thus, the operator lines up the apertures in the drag link with the through-pins and then physically pushes the drag link into position to effect locking. However, it is also desirable that the detachability of the drag link from the through-pins be the result of purposeful intent and not accident. Accordingly, it should be noted that the radial wall 21 of the groove 18 effectively minimizes release of the drag link through accidental or inadvertent means. To release the drag link the operator presses the upper portion of the resilient clip that extends beyond the edge of the drag link to effect lateral displacement of the clip 23 from the groove 18.

It is thus apparent that the position of the clip with respect to the drag link and the associated aperture therein is important. To properly position the clip while minimizing its cost by fabricating it in a configuration symmetrical to its longitudinal axis 33, it will be seen that the clip is properly positioned in relation to the associated aperture in the drag link when the bearing portions 36 and 36' of each clip lie equally spaced on opposite sides of the central axis line 26 of the drag link, and equally spaced on opposite sides of a transverse plane represented by the line 39. The line 39 passes through the intersection of the longitudinal axis 26 of the drag link and the longitudinal axis 33 of the resilient clip and is perpendicular to the axis 26.

Thus positioned and properly proportioned, a semi-circular portion of the resilient clip crosses the associated aperture 27 or 28 at the proper position to be resiliently displaced automatically by the conical end portion 22 of the through-pin.

Although the best mode contemplated for carrying out the present invention has been herein shown and described, it will be apparent that modification and variation may be made without departing from what is regarded to be the subject matter of the invention.

What is claimed is:

1. In a coupling of the type including a pin interconnecting at least two members with one member having a hole rotatable about the axis of said pin, and retaining means for preventing uncoupling of said member; the improvement wherein said retaining means comprises a resilient clip mounted on said one member, said clip having a portion lying within the projected area of the hole receiving said pin, a camming surface on one end of said pin being operative to laterally displace said clip upon assembly of said one member on said pin, an annular groove in said pin axially inward of and adjacent said camming surface for receiving said portion of said clip and thus preventing disassociation of said rotatably connected members, said clip being generally C-shaped and being provided with a pair of free ends pivotally anchored to said one member, said C-shaped retaining clip being elongated and generally symmetrical with respect to a longitudinal axis, said one member being elongated and generally symmetrical with respect to a longitudinal axis, the longitudinal axis of said C-shaped retaining clip being angularly disposed with respect to the longitudinal axis of said one member, and said pin lying disposed wholly on one side of the longitudinal axis of said clip in both engaged and disengage positions of the clip.

2. In a coupling of the type including a pin interconnecting at least two members with one member having a hole rotatable about the axis of said pin, and retaining means for preventing uncoupling of said members: the improvement wherein said retaining means comprises a resilient clip mounted on said one member, said clip having a portion lying within the projected area of the hole receiving said pin, a camming surface on one end of said pin being operative to laterally displace said clip upon assembly of said one member on said pin, an annular groove in said pin axially inward of and adjacent said camming surface for receiving said portion of said clip and thus preventing disassociation of said rotatably connected members, said resilient clip being provided with a generally semi-circular main body portion adapted to lie in planar abutment with said one member, integral bearing portions perpendicular to said main body portion and journaled on said one member, and integral end portions impinging against the opposite side of said one member from said main body portion of the clip to clamp the clip to said one member whereby the clip may be sprung into and out of engagement with the locking portion of said pin.

3. The combination according to claim 1, in which said camming surface of said pin includes a conically tapered portion adapted to engage the inner periphery of said resilient clip when said support pin is projected through the hole in said one member to resiliently displace the clip to effect engagement thereof with said pin when the pin is fully projected through said aperture.

4. The combination according to claim 2, in which said first portion of said resilient clip lies in planar abutment with said one member, and a second portion of said clip extends beyond the outer extremity of said one member to place said second portion in position to permit easy access and manual displacement of said clip to release the clip from the annular groove in said pin.

* * * * *